United States Patent [19]

Maddox

[11] Patent Number: 4,687,495

[45] Date of Patent: Aug. 18, 1987

[54] FLOW CONTROL SYSTEM FOR EROSIVE FLUIDS

[75] Inventor: James P. Maddox, Van Nuys, Calif.

[73] Assignee: Imo Delaval Inc., Lawrenceville, N.J.

[21] Appl. No.: 915,388

[22] Filed: Oct. 6, 1986

[51] Int. Cl.⁴ ............................................. B01D 19/00
[52] U.S. Cl. ......................................... 55/46; 55/52; 55/55; 55/189; 55/190
[58] Field of Search ................ 55/183, 189, 190, 194, 55/52, 55, 45, 46, 51

[56] References Cited

U.S. PATENT DOCUMENTS

| | | | |
|---|---|---|---|
| 1,652,956 | 12/1927 | Purtyman | 261/118 |
| 3,134,655 | 5/1964 | Boucher | 55/52 |
| 3,358,425 | 12/1967 | Burnham | 55/52 |
| 3,398,507 | 8/1968 | Balogh et al. | 55/55 |
| 4,266,951 | 5/1981 | Calvert | 261/118 |

Primary Examiner—Bernard Rozick
Attorney, Agent, or Firm—Walter Unterberg

[57] ABSTRACT

A system for pressure letdown and flow control of high-pressure erosive fluid streams containing gas, liquid and solid particles, such as process slurries used in coal gasification and liquefaction. Throttle valves presently used for this application suffer excessive impingement erosion and corrosion damage, leading to short valve lifetime even with super-resistant valve materials. The present invention uses pairs of fixed-geometry opposing nozzles whose jets meet head-on with consequent energy dissipation and stream containment at the reduced pressure. The only erosion encountered here is scouring of internal nozzle surfaces which is minor and permits long lifetimes to be attained with conventional materials. This system provides flow control by (1) varying the number of nozzle pairs which are on-line by use of on-off shutoff valves for stepwise flow increments, and (2) low-pressure-drop operation of a conventional throttle valve in the main line for proportional control within one step increment. Different nozzle designs accommodate supercritical, subcritical and gasless hydraulic flow.

8 Claims, 5 Drawing Figures

FLOW CONTROL SYSTEM FOR EROSIVE FLUIDS

BACKGROUND OF THE INVENTION

1. Field of the Invention

This invention relates to devices used to control the flow of fluids containing solid particles and other harsh contaminants, such as process slurries used in coal gasification and liquefaction. More specifically, it relates to the use of pairs of opposing jets originating from nozzles for pressure letdown and flowrate variation of erosive fluids.

2. Prior Art

Present technology for flow control and pressure letdown of fluids containing erosive solids utilizes throttle valves of various kinds such a conventional globe valves angle valves, and plug-and-seat valves. Conventional globe valves have abrupt changes in flow direction through the valve body and around the plug/seat which particles in the stream cannot follow and so impinge on solid surfaces in the valve cauisng severe erosion. In the Willis angle valve rotating and stationary disks with one or more holes are used, with flow throttling achieved by the angle of rotation of the rotating disk, e.g., 0° being fully closed and 90° fully open. Here particle impingement causes erosion of both disks. Like the angle valve plug-and-seat valves(Cameron Kieley-Muller) have no abrupt changes in flow direction, but all the same both plug and seat suffer erosion regardless of the design of the countour of the variable area due to plug motion.

The erosion of throttle valves by solids in the flow leads to associated problems such as:

1. Short valve lifetime due to rapid erosion/corrosion of valve body and trim;
2. Loss of flow control due to erosion, structural failure of trim elements and accumulatlon of and plugging by solids in the stream;
3. High safety hazard due to increased risk of structural failure from erosion; and
4. High cost of valves due to need for expensive, scarce, refractory trim materials (stellite, tungsten carbide) to achieve present technology "short" operating lifetimes.

SUMMARY OF THE INVENTION

Accordingly, it is an object of this invention to provide an alternative long-life flow control and pressure letdown system for use with erosive fluids to replace present technology throttle valves of limited life due to severe erosion damage.

It is a further object to provide a system which is less susceptible to plugging by accumulation of solids and therefore capable of greater operational availability and contributing to higher system reliability.

Another object is to eliminate the need for expensive and scarce materials now used for throttle valve components to combat erosion, and to substitute conventional materials which are inexpensive and highly available.

A further object is to improve the operational safety of process operations with erosive fluids compared with that of the inherent high-risk hazard present technology valves.

Lastly, it is an object of this invention to reduce operation and maintenance costs below those incurred in present technology slurry pressure letdown processing.

The present invention implements the above-stated objects and provides a superior alternative to throttle valves for flow control and pressure letdown of erosive fluids. Both functions are accomplished through the use of multiple pairs of nozzles, with one nozzle in a pair aligned coaxially in opposition to the other. The nozzles are mounted in the side wall of a receiver tank which functions as a vapor-liquid separator if free and/or dissolved gases are present in the liquid. In any case the receiver tank acts as a flow accumulator vessel which discharges all the nozzle flow to the next processing stage, and provides for containment and energy dissipation of the kinetic energy of both opposing jets within a highly turbulent fluid core formed just downstream of the nozzle exit planes. Because of the stagnation flow condition produced by each active pair of nozzles, the resultant momentum of the flow discharging from the turbulent core will be small. Therefore, the internal surfaces of the receiver tank and the exposed external surfaces of the nozzles will come into contact with low-velocity fluid, with resulting low surface erosion rates. The kinetic energy of the jets is converted into heat in this isenthalpic process just as with throttle valves.

The nozzle internal surfaces will be subject to "scouring" erosion due to the turbulent velocity component of the particulates which are forced to move parallel to the nozzle walls because of the straight-through nozzle design. "Scouring" erosion is much milder than the "impingement" erosion which affects throttle valves of all types due to changes in flow direction, as discussed under Prior Art above. So the operating life of a nozzle is significantly greater than that of a throttle valve when used for erosive service.

Turndown flow control, or actual variation in flow rate, is achieved in two ways. First discrete stepwise flow increments or decrements are obtained by varying the number of nozzle pairs which are on-line by means of on-off gate or ball type shutoff valves. Second, proportional flow control between these steps is obtained by operating a globe valve in the main line for partial throttling, since the interval between N and (N-1) nozzle pairs to be controlled is small. With such small adjustments, the pressure drop in the stream is low so that valve erosion rates are acceptable low and conventional trim materials are adequate.

BRIEF DESECRIPTION OF THE DRAWING

The features of the invention are illustrated in the drawing where like reference characters designate the same items in the several views.

DETAILED DESCRIPTION OF THE PREFERRED EMBODIMENT

Figure 1:
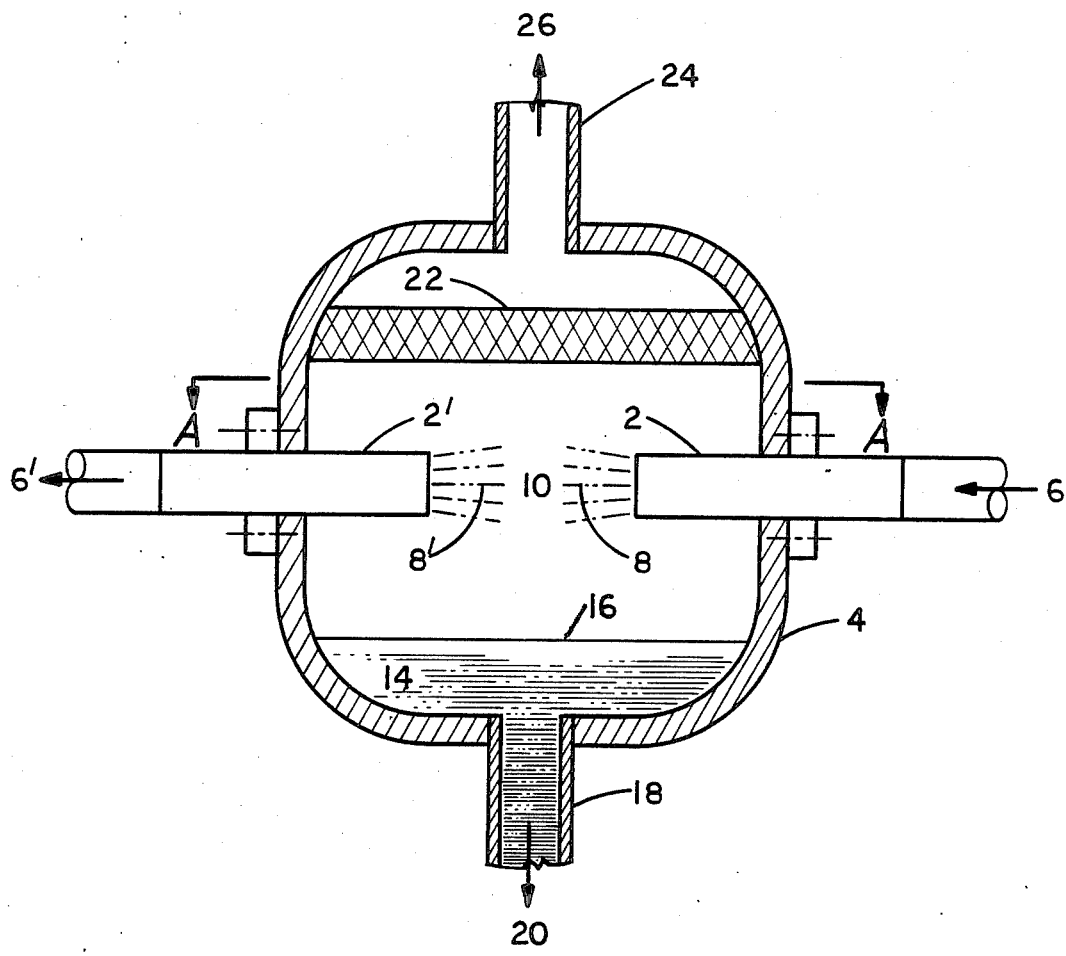
FIG. 1 is a side sectional view of the Flow Control System with multiple nozzle pairs, showing a typical nozzle pair.
Figure 2:
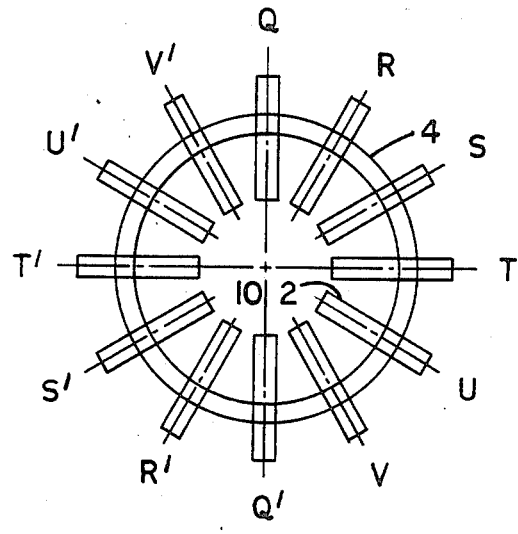
FIG. 2 is a sectional view from above along direction A-A in FIG. 1 of the Flow Control System, typically showing six nozzle pairs for a 6:1 turndown ratio.

FIG. 1 and FIG. 2 show a multiplicity of pairs of identical but coaxially opposed nozzles designated 2—2', Q—Q', R—R', and so on, mounted on the side walls of receiver tank 4. Referring to FIG. 1 which is a section showing one typical nozzle pair 2—2', the nozzles 2 and 2' are fed by corresponding flow branches 6 and 6', the flow consisting of a high pressure mix, or slurry, of gases, liquids and solid particles which is to be expanded to a lower pressure. Nozzles 2 and 2' are arranged coaxially in an equal and opposite manner so that the high-velocity, highly turbulent jets 8 and 8' issuing from the nozzle pair 2 and 2' meet head-on in mixing region 10 where the momentum of both jets is reduced to zero the kinetic energy is disipated into heat, and the pressure inside the receiver tank 4 is reduced below the high pressure level in flow branches 6 and 6'.

As a result of the pressure reduction, the gases and any flashed vapors from jets 8 and 8' flow upward through a mesh-type mist eliminator 22 to the gas outlet 24 as gas/vapor stream 26. Any liquids or solids entrained in the upward gas/vapor flow are trapped in the mist eliminator 22 to keep flow 26 free from condensed liquids or solids. The liquid, and solid particles from jets 8 and 8' collect in sump 14 with free surface 16 and flow out the slurry outlet 18 as slury stream 20.

Figure 3:
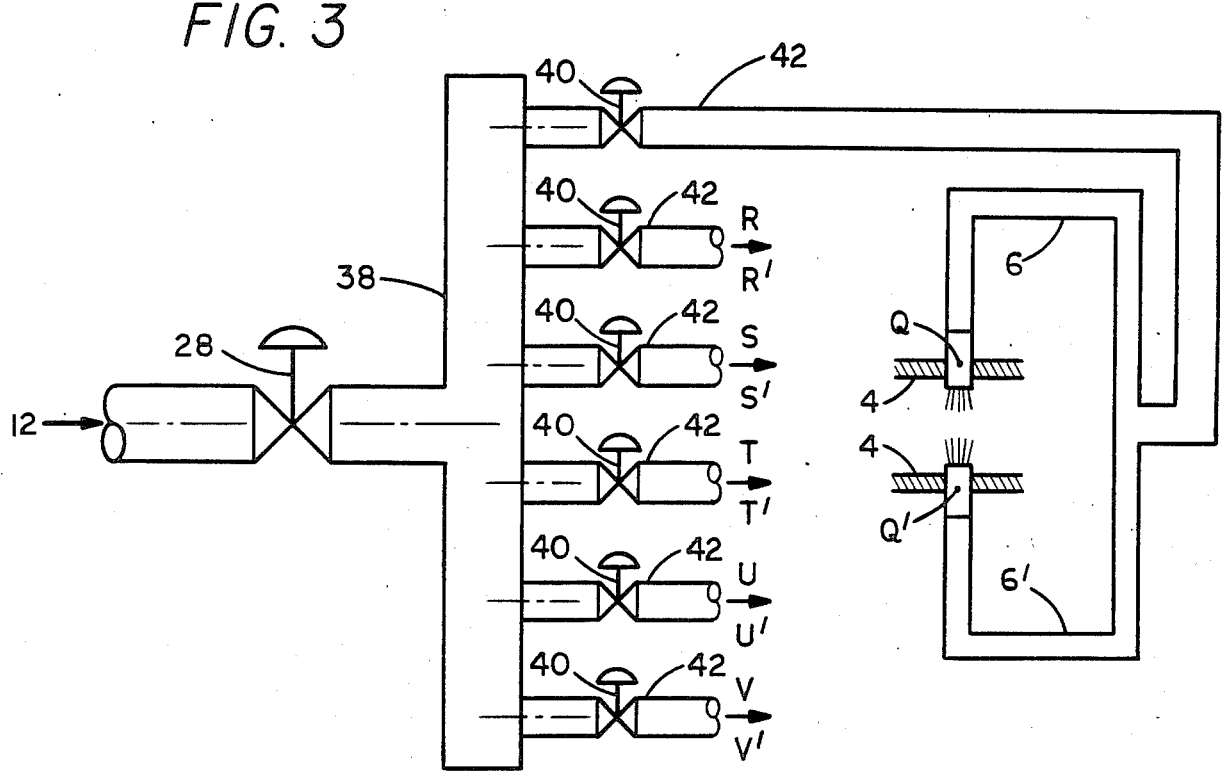
FIG. 3 is a flow schematic of the flow control system, showing the progress of the erosive fluid from the main line to the nozzle jets.

Now referring to FIG. 2 and FIG. 3, the principle of flow control is illustrated. To accommodate a large variation in flow multiple nozzle pairs are used. As an example six slurry pairs are shown, but any number of pairs could be used, as indicated by design considerations stated later on in this specification. The six nozzle pairs shown are designated Q—Q', R—R', S—S' T—T', U—U', and V—V'. In FIG. 2 they arranged in the manner of a clock face, with all nozzles attached to tank 4, pointing radially inward, with mixing region 10 at the center where all nozzle centerlines intersect. In FIG. 3 the complete schematic of the Flow Control System is shown. The erosive fluid flows in main line 12 and through a conventional throttle valve 28, typically a globe valve, into nozzle manifold 38 from which identical connectors 42, provided with shutoff valves 40, supply twin flow branches 6 and 6' feeding twin nozzles such as Q and Q', located in the walls of receiver tank 4. The shutoff valves 40 are typically of the ball or gate type.

For full flow, all six nozzle pairs are on-line, achieved by keeping valve 28 and all six valves 40 wide open. For a turndown ratio of 5:6, one valve 40 is shut off, leaving five connectors 42 in operation. Similarly, additional connectors may be taken off the line, with a maximum turndown ratio of 1:6. This stepwise turndown flow control is supplemented by a proportional flow control within-each step, achieved by a small amount of throttling using valve 28 which normally is open for stepwise control. The interval to be controlled is small so that the pressure drop across the valve 28 and the associated valve erosion rate are also small, permitting conventional trim materials to be used.

The fixed geometry nozzles suffer only minor damage from scouring erosion due to suspended solid particles in the flow. The internal contouring of the nozzle flow passages is always gradual tending to minimize scouring erosion.

The design of the Flow Control System as shown in FIG. 1, FIG. 2 and FIG. 3 must consider the following parameters:

a. Composition of high pressure flow in terms of: fractions of gas, liquid and solids; solid particle density, size distribution and hardness; gas and liquid chemical, thermodynamic and transport properties.

b. Flow stream characteristics in terms of: maximum and minimum flowrates; pressures and temperatures at the high-pressure and low-pressure extremes.

c. Duty cycle of processing operations.

d. Permissible liquid carryover and (if applicable) vapor/gas carryunder.

Figure 4:
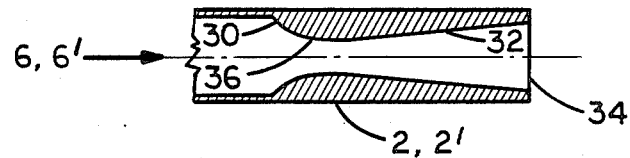
FIG. 4 is a sectional view of a convergent-divergent flow nozzle suitable for supercritical gas streams with liquid dropelts and/or solid particles in the flow.

If the stream consists of a predominantly compressible gas/vapor component, and if the ratio of the high pressure to the low pressure exceeds the critical ratio at which the stream reaches sonic velocity, then a convergent-divergent design for nozzles must be used for efficient expansion. FIG. 4 shows such a design in which the convergent flow section 30 of the nozzles 2 and 2' reaches a minimum flow area or throat 36, followed by a divergent section 32 to the exit plane 34. The stream velocity increases continuously from the inlet, reaching the sonic value at throat 36, and then increases further to a value in excess of sonic at the divergent exit 34.

Figure 5:
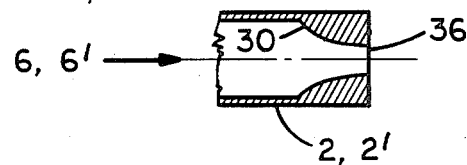
FIG. 5 is a sectional view of a convergent flow nozzle suitable for (1) subcritical gas streams with liquid droplets and/or solid particles in the flow or (2) liquid streams with solid particles and small amounts of gases in the flow.

If the stream is compressible, as above, but the ratio of high pressure to low pressure is smaller than or equal to the critical ratio, then a convergent nozzle should be used. FIG. 5 shows such a design where only a convergent section 30 is used, reaching a minimum area or throat 36 at the exit. The stream velocity continuously increases from the inlet, reaching a maximum value equal to or less than sonic at the throat 36.

If the stream mixture is predominantly a liquid with suspended solid particles and a small amount of gas, the flow is basically incompressible and the optimum nozzle design is convergent only, regardless of the pressure ratio, known as a hydraulic nozzle. In this case a nozzle design such as in FIG. 5 should be used. As before, the stream velocity increases to a maximum at the throat exit 36.

The flow turndown ratio, or modulation range about the nominal value, determines the number of nozzle pairs required, and the degree, if any, of low-pressure-drop throttling to be provided by valve 28.

The design of receiver tank 4 follows standard practice for vapor-liquid separation, if this is required, or for a "liquid only" receiver tank if no gases or vapors are present. The liquid level 16 in receiver tank 4 relative to the vertical location of the nozzle pairs(2—2') will affect liquid carryover and internal exposed surface erosion. Referring to FIG. 1, if a nozzle pair (2—2') is submerged below liquid level 16, more protection will be provided against internal nozzle erosion, but liquid carryover will then increase. The preferred design is as shown in FIG. 1, with nozzles 2—2' above liquid level 16 to minimize carryover, and a level control device to keep level 16 stable and within acceptable vertical limits.

The preferred embodiment of the invention has been described above, but it should be understood that changes may be made in the system without departing from the spirit f the invention or changing the scope of the invention as defined in the claims.

I claim:

1. A system for pressure letdown and flow control of a high-pressure erosive fluid stream containing gas, liquid, and solid particle fractions, comprising
   a source of said fluid stream;
   a main line with one end connected to said source:
   a manifold connected to the other end of the main line:
   a throttle valve in the mainline between said source and said manifold;
   a multiplicity of combinations, each consisting of a shutoff valve,
   a connector, twin flow branches and a pair of nozzle means, said combinations plumbed in parallel to said manifold, with the shutoff valve next to the manifold, and one of the nozzle means in each said pair of nozzle means aligned coaxially in opposition to the other nozzle means in the pair of nozzle means;
   a receiver tank with side wall openings accepting said multiplicity of pairs of opposed nozzle means directed into said tank through said openings toward the center of said tank;
   a slurry outlet in said tank for the outflow of said liquid and solid particle fractions of said fluid stream from said tank;
   a gas outlet in said tank for the outflow of said gas fraction of said fluid stream from said tank and
   a mist eliminator in said tank located between said multiplicity of pairs of nozzle means and said gas outlet.

2. The system of claim 1 wherein said nozzle means is a convergent-divergent flow nozzle suitable for supercritical flow of said stream with predominant gas fraction.

3. The system of claim 1 wherein said nozzle means is a convergent flow nozzle suitable for subcritical or critical flow of said stream with predominant gas fraction.

4. The system of claim 1 wherein said nozzle means is a convergent hydraulic nozzle suitable for flow of said stream with predominant liquid fraction.

5. The system of claim 1 wherein said receiver tank sidewalls are a vertical cylinder and said multiplicity of pairs of nozzle means are directed radially inward through said sidewall openings toward the center of the cylinder.

6. The system of claim 5 wherein said multiplicity of pairs of nozzle means and said tank sidewall openings which accept said multiplicity of pairs of nozzle means are positioned in one or more horizontal planes at differing radial locations.

7. In a system for pressure letdown and flow control of a high-pressure erosive fluid stream containing gas, liquid, and solid particle fractions, comprising
   a source of said fluid stream;
   a main line with one end connected to said source;
   a manifold connected to the other end of the main line;
   a throttle valve in the mainline between said source and said manifold;
   a multiplicity of combinations, each consisting of a shutoff valve, a connector, twin flow branches and a pair of nozzle means, said combinations plumbed in parallel to said manifold, with the shutoff valve next to the manifold, and one of the nozzle means in each said pair of nozzle means aligned coaxially in opposition to the other nozzle means in the pair of nozzle means;
   a receiver tank with side wall openings accepting said multiplicity of pairs opposed nozzle means directed into said tank through said openings toward the center of said tank;
   a slurry outlet in said tank for the outflow of said liquid and solid particle fractions of said fluid stream from said tank;
   a gas outlet in said tank for the outflow of said gas fraction of said fluid stream from said tank; and
   a mist eliminator in said tank located between said multiplicity of pairs of nozzle means and said gas outlet:
   the method for flow control comprising (1) stepwise incremental control by opening or closing said shutoff valves to bring pairs of nozzle means on and off line, and (2) proportional control between steps by small adustments of the throttle valve in the main line between the fuel source and the manifold.

8. In a system for letting down a high-pressure erosive fluid stream containing gas, liquid, and solid particle fractions comprising
   a source of said fluid stream;
   a main line with one end connected to said source;
   a manifold connected to the other end of the main line;
   a throttle valve in the mainline between said source and said manifold;
   a multiplicity of combinations, each consisting of a shutoff valve, a connector, twin flow branches and a pair of nozzle means, said combinations plumbed in parallel to said manifold, with the shutoff valve next to the manifold, and one of the nozzle means in each said pair of nozzle means aligned coaxially in opposition to the other nozzle means in the pair of nozzle means;
   a receiver tank with side wall openings accepting said multiplicity of pairs of opposed nozzle means directed into said tank through said openings toward the center of said tank;
   a slurry outlet in said tank for the outflow of said liquid and solid particle fractions of said fluid stream from said tank;
   a gas outlet in said tank for the outflow of said gas fraction of said fluid stream from said tank, and
   a mist eliminator in said tank located between said multiplicity of pairs of nozzle means and said gas outlet:
   the method for fluid pressure letdown comprising the direction of said fluid stream through said multiple airs of nozzle means, the two nozzle means in each pair aligned coaxially opposed to each other and discharging said fluid through said sidewalls into said tank so that the kinetic energies of the opposing fluids are dissipated inside said tank with associated expansion to a lower pressure, and a gas-liquid separation, with gases flowing through said gas outlet and the liquid-solid slurry flowing through said slurry outlet.

* * * * *